US006771659B1

(12) United States Patent
Parantainen et al.

(10) Patent No.: US 6,771,659 B1
(45) Date of Patent: Aug. 3, 2004

(54) METHOD AND APPARATUS FOR A SELECTIVE ACKNOWLEDGEMENT SCHEME IN A MODIFIED UNACKNOWLEDGE MODE FOR USE OVER A COMMUNICATIONS LINK

(75) Inventors: Janne Parantainen, Helsinki (FI); Mika Forssell, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/489,262

(22) Filed: Jan. 21, 2000

(51) Int. Cl.$^7$ .............................. H04J 3/22; H04J 3/24; H04Q 7/00
(52) U.S. Cl. ...................... 370/466; 370/324; 370/312; 370/349; 370/465
(58) Field of Search .............................. 370/329, 312, 370/349, 466, 465; 714/748–750

(56) References Cited

U.S. PATENT DOCUMENTS

| | | | | |
|---|---|---|---|---|
| 5,959,995 A | * | 9/1999 | Wicki et al. ................ | 370/400 |
| 5,970,063 A | | 10/1999 | Chapman et al. | |
| 6,452,940 B1 | * | 9/2002 | Yared et al. ................ | 370/465 |
| 6,463,055 B1 | * | 10/2002 | Lupien et al. .............. | 370/353 |
| 6,553,235 B2 | * | 4/2003 | Bark et al. .................. | 455/453 |

FOREIGN PATENT DOCUMENTS

| | | |
|---|---|---|
| EP | 0735701 | 10/1996 |
| EP | 0735774 | 10/1996 |
| EP | 0973302 | 1/2000 |
| JP | 410322356 A | * 12/1988 ........... H04L/12/28 |
| WO | WO0154338 | 7/2001 |

OTHER PUBLICATIONS

ETSI EN 301 349 v6.4.1 (Dec. 1999), Digital Cellular Telecommunications System (Phase 2+); General Packet Radio Service (GPRS); Mobile Station (MS) –Base Station-System (BSS) Interface; Radio Link Radio Link Control/ Medium Access Control (RLC/MAC) Protocol, GSM 04.60 version 6.4.1/Release 1997), Chapter 9, pp. 63–73.
Patent Cooperation Treaty International Search Report dated Mar. 16, 2001 (7pp).
Patent Cooperation Treaty International Search Report dated Mar. 16, 2001 (4pp).

* cited by examiner

Primary Examiner—Seema S. Rao
Assistant Examiner—Ronald Abelson

(57) ABSTRACT

A modified unacknowledge mode of a telecommunications system interface is defined by providing for a special signaling indication by way of a selected packet, signaling sequence, message, or the like, from a transmitting side to a receiving side that a given message, packet, cell, signaling sequence, or the like is to be treated specially, despite the unacknowledge mode being used, by acknowledging receipt thereof at the receiving side back to the transmitting side. In this way, certain important messages can be acknowledged, while less important messages can be sent without acknowledgement. This reduces the need for wasteful use of capacity for applications in which some of the messages are more important than others to be received correctly.

32 Claims, 13 Drawing Sheets

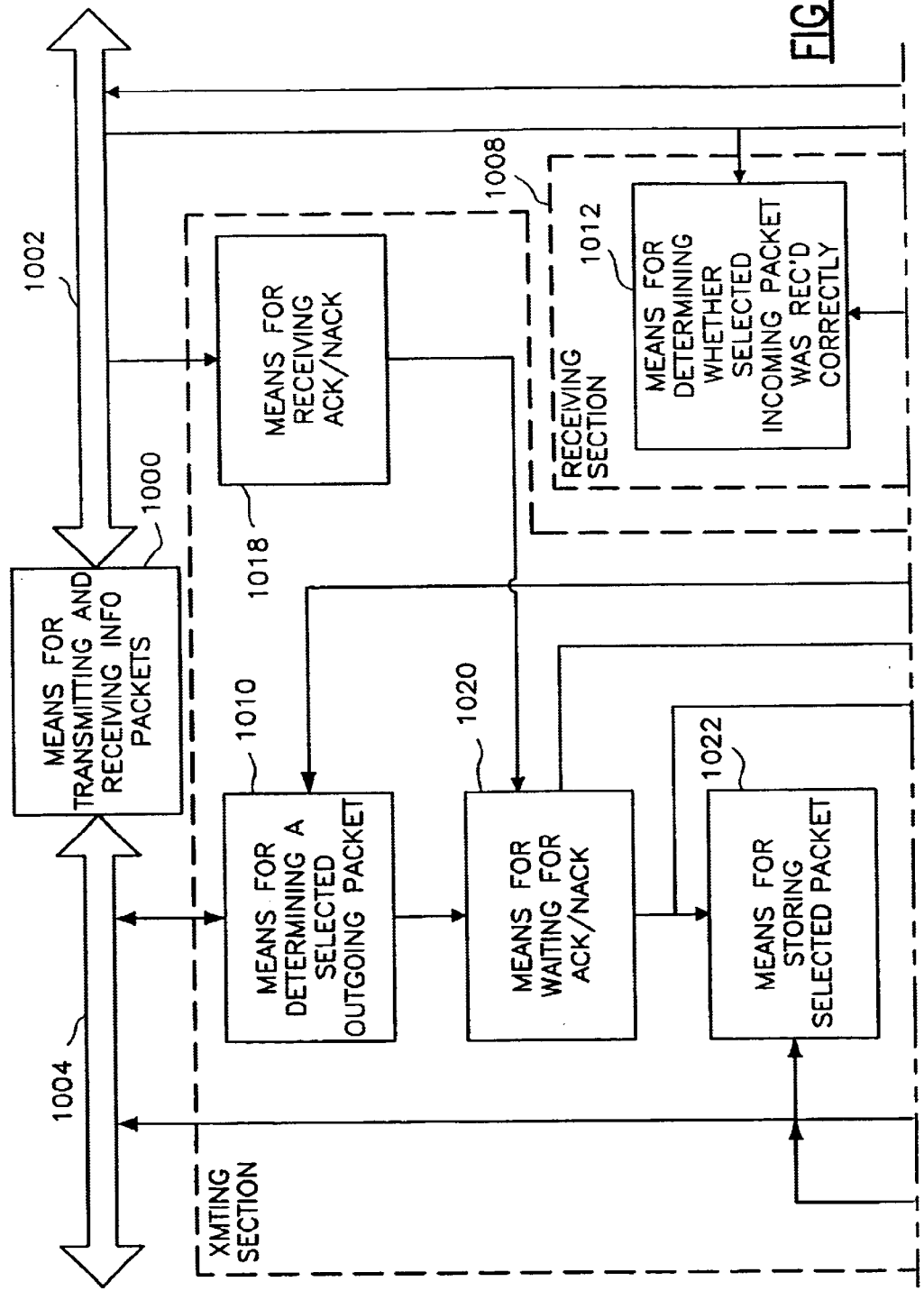

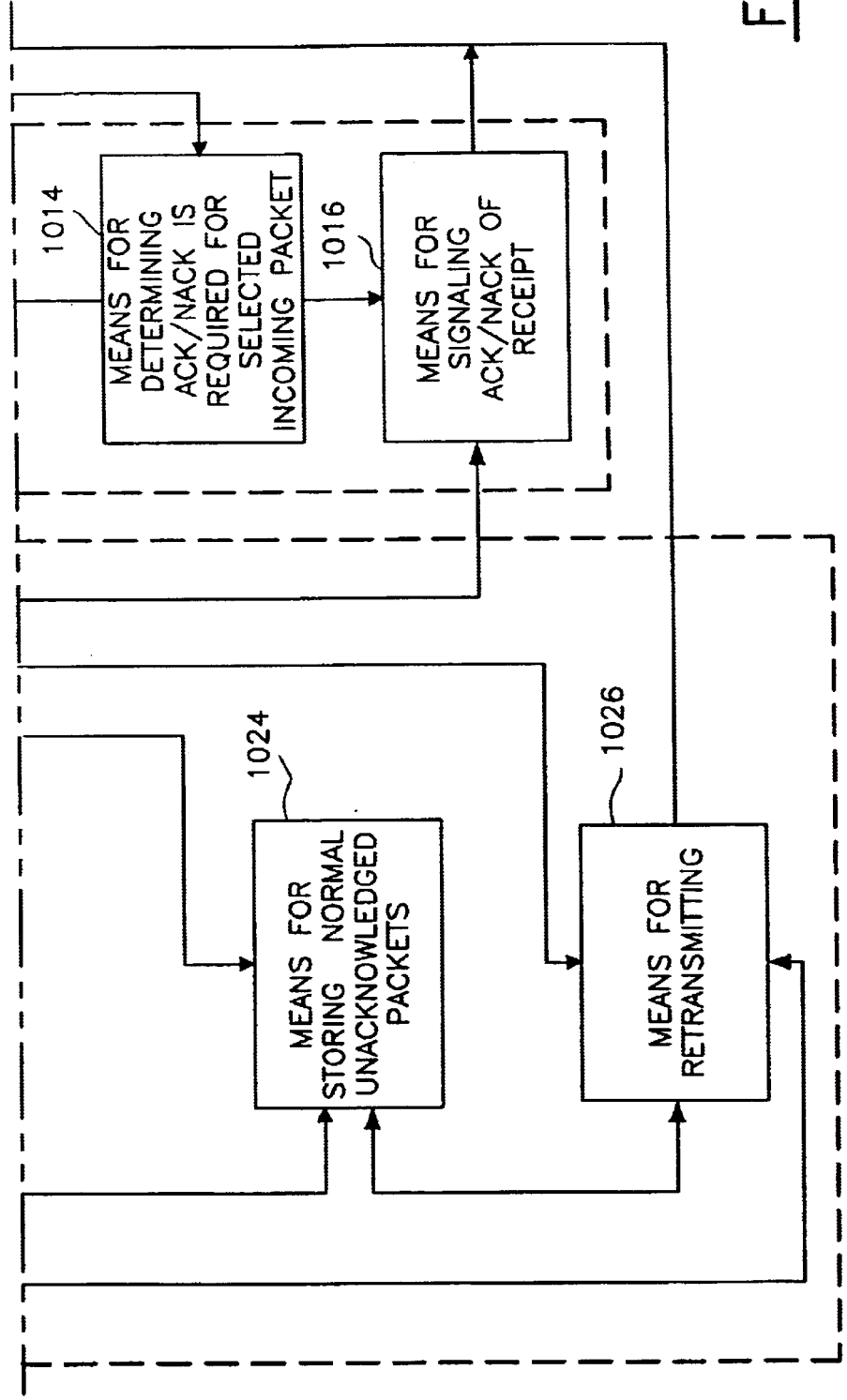

METHOD AND APPARATUS FOR A SELECTIVE ACKNOWLEDGEMENT SCHEME IN A MODIFIED UNACKNOWLEDGE MODE FOR USE OVER A COMMUNICATIONS LINK

TECHNICAL FIELD

This invention relates to telecommunications and, more particularly, to acknowledgement by a receiving side to a transmitting side of receipt of a message over a communications link.

BACKGROUND OF THE INVENTION

A transmitting side communicating with a receiving side over a communications link will often require acknowledgement of messages and therefore provide for an "acknowledge mode". Messages, for instance, packets, signaling sequences, or the like are identified to the receiving side as requiring acknowledgement. An acknowledgement in the form of one or more bits of a signaling sequence, packet or the like in the reverse direction from the receiving side to the transmitting side indicates receipt of the message. Provision may also be made for positively indicating, one way or the other, whether the message was received correctly or not. The transmitting side waits for the acknowledgement message and takes further steps contingent upon receipt or non-receipt thereof. Similarly, an "unacknowledge mode" can be defined for such communications links, wherein for a given sequence of messages it is negotiated by signaling between the transmitting and receiving sides that such messages are not to be acknowledged. For instance, important data messages might use the "acknowledge mode", while other types of messages, such as voice, might not, and instead use the "unacknowledge mode".

With certain types of applications some of the transmitted protocol data units are more important than others to be received correctly. Thus, acknowledgements are needed to get the information whether important packets were lost or not, while acknowledging unimportant packets would simply increase delay, waste capacity and decrease throughput.

Unfortunately, both the known "acknowledge mode" and "unacknowledge mode" require that all messages, packets, or the like be either acknowledged or not acknowledged.

DISCLOSURE OF THE INVENTION

The object of the present invention is to provide a selective acknowledgement scheme for a wireless interface between a transmitting side and a receiving side.

According to the first aspect of the present invention, a method for use in a telecommunications system having the capability to exchange information packets over a communications link in both an acknowledge mode in which reception by a receiver of all information packets transmitted by a transmitter over the communications link are acknowledged by the receiver sending at least one acknowledge message over the communications link back to the transmitter and in an unacknowledge mode in which none of the information packets transmitted by the transmitter over the communications link are acknowledged by the receiver, is characterized by said transmitter in said unacknowledge mode nevertheless determining from among a plurality of packets destined for transmission to the receiver in said unacknowledge mode a selected packet for which an acknowledgement of receipt from the receiver is required, and signaling said receiver that said acknowledgement of receipt of said selected packet is required from the receiver.

In further accord with to the first aspect of the invention, said transmitter after transmitting said selected packet, waits during a set time period thereafter for receipt of said acknowledgement from said receiver before taking further steps contingent on said acknowledgement of receipt by said receiver.

Still according to the first aspect of the invention, said transmitter stores the selected packet during said set time period at least until said receipt of said acknowledgement from said receiver.

Still further according to the first aspect of the invention, said transmitter, after said selected packet is transmitted to the receiver, also stores during said set time period packets for which acknowledgement is not required at least until said receipt of said acknowledgement from said receiver.

According still further to the first aspect of the invention, said transmitter retransmits to said receiver said stored selected packet and said stored packets for which acknowledgement was not required after said set time elapses without receipt of said acknowledgement from said receiver.

Further still according to the first aspect of the invention, said transmitter retransmits to said receiver said stored selected packet after said set time elapses without receipt of said acknowledgement from said receiver.

In further accordance with the first aspect of the invention, the transmitter receives over said communications link from said receiver an acknowledgement of receipt of said selected packet and notifies a higher layer in a protocol stack of the transmitter of said receipt of said selected packet by said receiver.

Yet further still according to the first aspect of the invention, said transmitter waits for at least one further set time period after said step of retransmitting said stored selected packet for an acknowledgement of receipt thereof from the receiver before finally concluding that said retransmitted stored selected packet was not received by the receiver.

According further to the first aspect of the invention, said transmitter waits for at least one further set time period after said step of retransmitting said stored selected packet and said stored packets for which acknowledgement was not required, for an acknowledgement of receipt of the stored selected packet from the receiver before finally concluding that said retransmitted stored selected packet was not received by the receiver.

According still further to the first aspect of the invention, said transmitter concludes after lapse of said set time period without receiving said acknowledgement that said selected packet was not received by said receiver.

According yet further to the first aspect of the invention, said receiver in said unacknowledge mode determines reception over said communications link of said selected packet for which acknowledgement of receipt is required, and signals said acknowledgement of receipt to said transmitter over said communications link.

Further still according to the first aspect of the invention, said receiver determines whether said received selected packet was received correctly or not wherein said step of signaling said acknowledgement of receipt to said transmitter indicates correct or incorrect reception.

Yet still further according to the first aspect of the invention, said transmitter stores the selected packet during said set time period at least until receipt of said acknowledgement from said receiver and upon receipt by said transmitter of said acknowledgement indicative of incorrect reception of said selected packet, retransmits said selected packet.

Still further according to the first aspect of the invention, said receiver, after determining the selected packet was received incorrectly, continues to process incoming packets without any change in processing method therefor.

Yet further still according to the first aspect of the invention, said receiver saves packets received after determining the selected packet was received incorrectly until receiving the selected packet correctly after which the receiver processes incoming packets according to a method identified by said selected packet.

Still in accordance with the first aspect of the invention, the transmitter receives over said communications link from said receiver an acknowledgement of receipt of said selected packet and by notifying a higher layer in a protocol stack of the transmitter of said receipt of said selected packet by said receiver.

According to a second aspect of the invention, a transceiver having a receiving section and a transmitting section for use on both a receiving side and a transmitting side in a telecommunications system having the capability to exchange information packets over a communications link in both an acknowledge mode in which reception by a receiver section of a transceiver on the receiving side of all information packets transmitted by the transmitter section of a transceiver on the transmitting side over the communications link are acknowledged by the receiver section sending at least one acknowledge message over the communications link back to the transmitter section and in an unacknowledge mode in which none of the information packets transmitted by the transmitter section over the communications link are acknowledged by the receiver section, is characterized by said transmitter section in said unacknowledge mode nevertheless having means for determining from among a plurality of packets destined for transmission to the receiver section in said unacknowledge mode a selected packet for which an acknowledgement of receipt from the receiver section is required, and means for transmitting a signal to said receiver section that said acknowledgement of receipt of said selected packet is required from the receiver section.

According further to the second aspect of the invention, said transmitter section receives over said communications link from said receiving side an acknowledgement of receipt of said selected packet and by notifying a higher layer in a protocol stack of the transceiver of said receipt of said selected packet by said receiving side.

Further according to the second aspect of the invention, the transceiver is further characterized by said transmitter section having means for waiting during a set time period after transmitting said selected packet for receipt of said acknowledgement from said receiver section before taking further steps contingent on said acknowledgement of receipt by said receiver section.

Still further according to the second aspect of the invention, the transceiver is further characterized by said transmitter section having means for storing the selected packet during said set time period at least until said receipt of said acknowledgement from said receiver section.

Yet still further according to the second aspect of the invention, the transceiver is further characterized by said transmitter having means for also storing, after said selected packet is transmitted to the receiver, during said set time period packets for which acknowledgement is not required at least until said receipt of said acknowledgement from said receiver.

Yet further according to the second aspect of the invention, the transceiver is further characterized by said transmitter having means for retransmitting to said receiver said stored selected packet and said stored packets for which acknowledgement was not required after said set time elapses without receipt of said acknowledgement from said receiver.

Further in accordance with the second aspect of the invention, the transceiver is further characterized by said transmitter having means for retransmitting to said receiver said stored selected packet after said set time elapses without receipt of said acknowledgement from said receiver.

Further according to the second aspect of the invention, the transceiver is characterized by said transmitter section receiving over said communications link from said receiving side an acknowledgement of receipt of said stored selected packet and by notifying a higher layer in a protocol stack of the transceiver of said receipt.

Yet further in accordance with the second aspect of the invention, the transceiver is characterized by said receiver section in said unacknowledge mode having means for determining reception over said communications link of said selected packet for which acknowledgement of receipt is required, and means for signaling said acknowledgement of receipt to said transmitter second over said communications link.

Still further in accordance with the second aspect of the invention, the transceiver is characterized by said receiver section determining whether said received selected packet was received correctly or not, wherein said step of signaling said acknowledgement of receipt to said transmitter section indicates correct or incorrect reception.

Further still in accordance with the second aspect of the invention, the transceiver is characterized by said transmitter section storing the selected packet during said set time period at least until receipt of said acknowledgement from said receiver section and upon receipt by said transmitter section of said acknowledgement indicative of incorrect reception of said selected packet, retransmitting said selected packet.

Yet still in accordance with the second aspect of the invention, the transceiver is characterized by said receiver section, after determining the selected packet was received incorrectly, continuing to process incoming packets without any change in the processing method therefor.

Further in accordance with the second aspect of the invention, the transceiver is characterized by said receiver section saving packets received after determining the selected packet was received incorrectly until receiving the selected packet correctly after which the receiver section processes incoming packets according to a method identified by said selected packet.

This invention proposes a selective acknowledgement scheme that could be used for guaranteeing that important information is correctly received. The acknowledgement concept itself is a well-known technique to ensure that the data is correctly received. In this case, the data can be transmitted in unacknowledged, i.e., unreliable mode but higher layers of the protocol stack can ask for specific acknowledgements for certain packets. For instance, RTP/UDP/IP header compression could be used as an example application (acknowledgement of reference packets, reference time stamp of sequence number).

The invention as applied to header compression works as follows:

when the compression function wants to transmit reference values to the decompressor, it gives the data to the lower protocol layer with information that this packet needs to be acknowledged. The information that acknowledgement is needed can be carried in the protocol header or transferred by some other means, such as a specially defined primitive. When the decompressor acknowledges the packet, the information is given back to the higher protocol layer via the header or special primitive and directed to the certain function, e.g., the header compressor, which can now be sure that the particular packet (reference point) is correctly received. If the acknowledgement is not received within a predefined time, the compressor resends the reference point.

The description below assumes a General Packet Radio Service (GPRS) protocol stack. The application is as well applicable to any other telecommunications system.

Also, the GPRS protocol stack may evolve so that, e.g., SNDCP or LLC layers are removed. That does not change the applicability of the invention. The method may be applied also for other links/protocols than radio interface, e.g., BSSCP used in Gb interface between SGSN and BSS, Abis over satellite link.

The invention suits very well the situation where part of the packets are more important than others. Acknowledgement schemes have been specified to UMTS and to EGPRS. Thus only relatively small modifications to those schemes are needed.

The main application presently in mind for this invention is RTP/UDP/IP or TCP/IP header compression over a wireless link. Efficient header compression relies not on transmitting whole header fields but rather changes compared to some reference field or packet. If the reference packet was not received correctly the decompressor loses the compressor state and many packets will be lost before a new reference is correctly received. For this reason, an acknowledgement scheme is needed for these reference packets. The present invention solves this problem without wasting capacity/increasing delay by acknowledging normal packets.

Another important application of the present invention is different types of image and video coding schemes used in various telecommunications systems. Coding is often based on using some frame or lower-resolution image as a reference point to deduce the next frame of full-resolution image. As in the case of header compression, it is important that the reference point is correct. Thus, the invention could be utilized by having certain important frames acknowledged while less important frames (e.g., smaller details of a picture) can be sent without acknowledgements.

These and other objects, features and advantages of the present invention will become more apparent in light of the detailed description of a best mode embodiment thereof, as illustrated in the accompanying drawings.

BRIEF DESCRIPTION OF THE DRAWINGS

FIG. 8 shows how FIGS. 8A and 8B fit together.

FIG. 9 shows how FIGS. 9A and 9B fit together.

FIG. 10 shows how FIGS. 10A and 10B fit together.

FIGS. 10a and 10B together show a transceiver, according to the present invention, with a transmitting section for carrying out the steps of FIGS. 8A and 8B when operating as a transmitter in a modified unacknowledge mode, and a receiving section for carrying out the steps of FIGS. 9A and 9B when operating as a receiver in the modified unacknowledge mode.

BEST MODE FOR CARRYING OUT THE INVENTION

Below it is assumed that a modified unacknowledged RLC data transfer mode is defined and used in the setting of a mobile telecommunications system, but this example should not be construed as limiting the applicability of the invention thereto.

Figure 1:
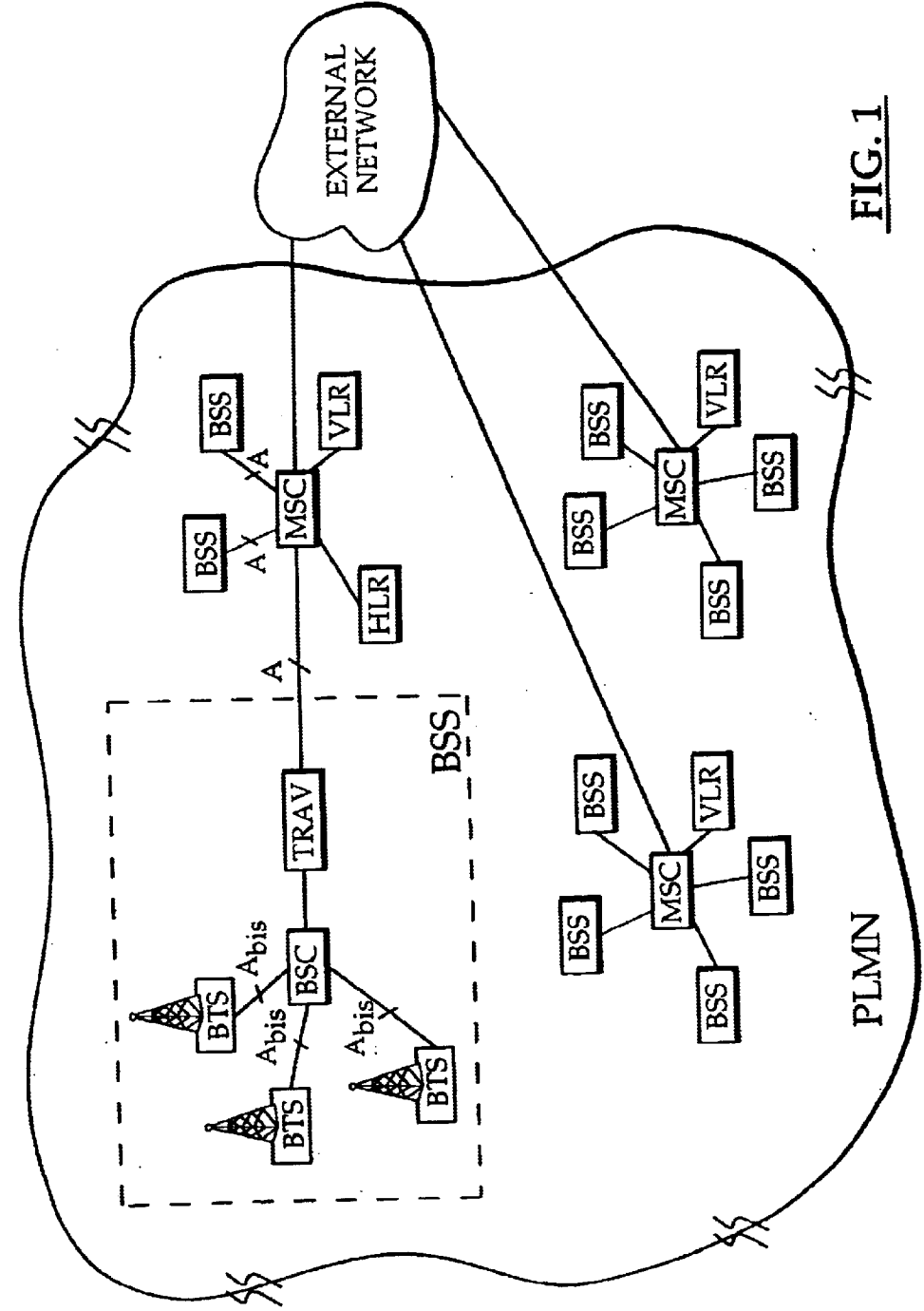
FIG. 1 shows the architecture of a public land mobile network (PLMN), according to the prior art.

FIG. 1 shows a GSM (Global System for Mobile Communication) public land mobile network (PLMN), according to a prior art telecommunications system in which the present invention can be applied. In that system, a plurality of mobile stations (not shown) communicate with one or more base transceiver stations (BTS), each connected to a given base station controller (BSC). A plurality of base transceiver stations in an area (cell) are connected to the BSC via a hardwire (Abis) interface. In this example of a telecommunications system, the interface between the mobile station and the base transceiver station with which it is in communication at any given time is, of course, a wireless, i.e., a radio link. Each base station controller is connected to a transcoding rate and adaptation unit (TRAU) which performs compression of data for reducing bandwidth usage over the air interface. The MS likewise assists in this task. All of the foregoing components together constitute a base station subsystem (BSS) which, in effect, are all network elements belonging to the radio part of a GSM system. As shown in the figure, a plurality of base station subsystems are connected to a mobile services switching center (MSC) via an A-interface. The MSC is similar to a regular digital telephone exchange and may be accessed by external networks in the same way. It routes incoming and outgoing calls and assigns user channels on the A-interface. The foregoing components, together with a visitor location register (VLR) to be described below, constitute the MSC's area, wherein a large number of BSCs can be connected to the MSC over a given geographical area. The figure shows many such MSC areas, each of which has access to at least one home location register (HLR) as a permanent store of data that has to be available with quick access time. The database manages data from literally hundreds of thousands of subscribers. Subscriber-specific parameters are maintained therein, with each subscriber assigned to one specific HLR which acts as a fixed reference point and where information on the current location of the user is stored. The visitor location register (VLR) shown in the MSC area of FIG. 1 was invented to support the HLR by handling many of the subscriber-related queries such as localization and approval of features. The VLR provides dynamic subscriber data management, while the HLR is responsible for more static functions. For instance, when a subscriber is roaming, data is passed between the VLR of the location the subscriber is leaving to the new VLR, and the HLR need not even be accessed.

Figure 2:
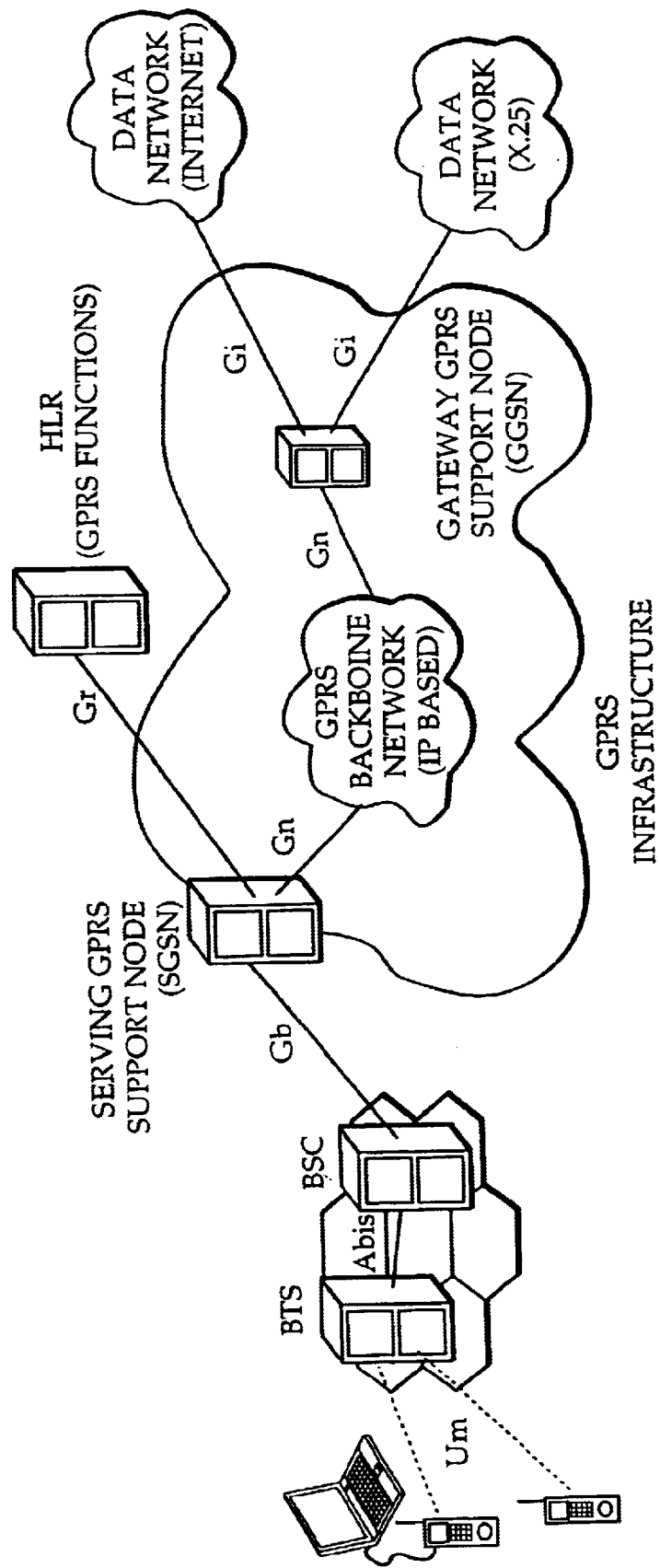
FIG. 2 shows a general packet radio service (GPRS) network architecture, according to the prior art.
Figure 3:
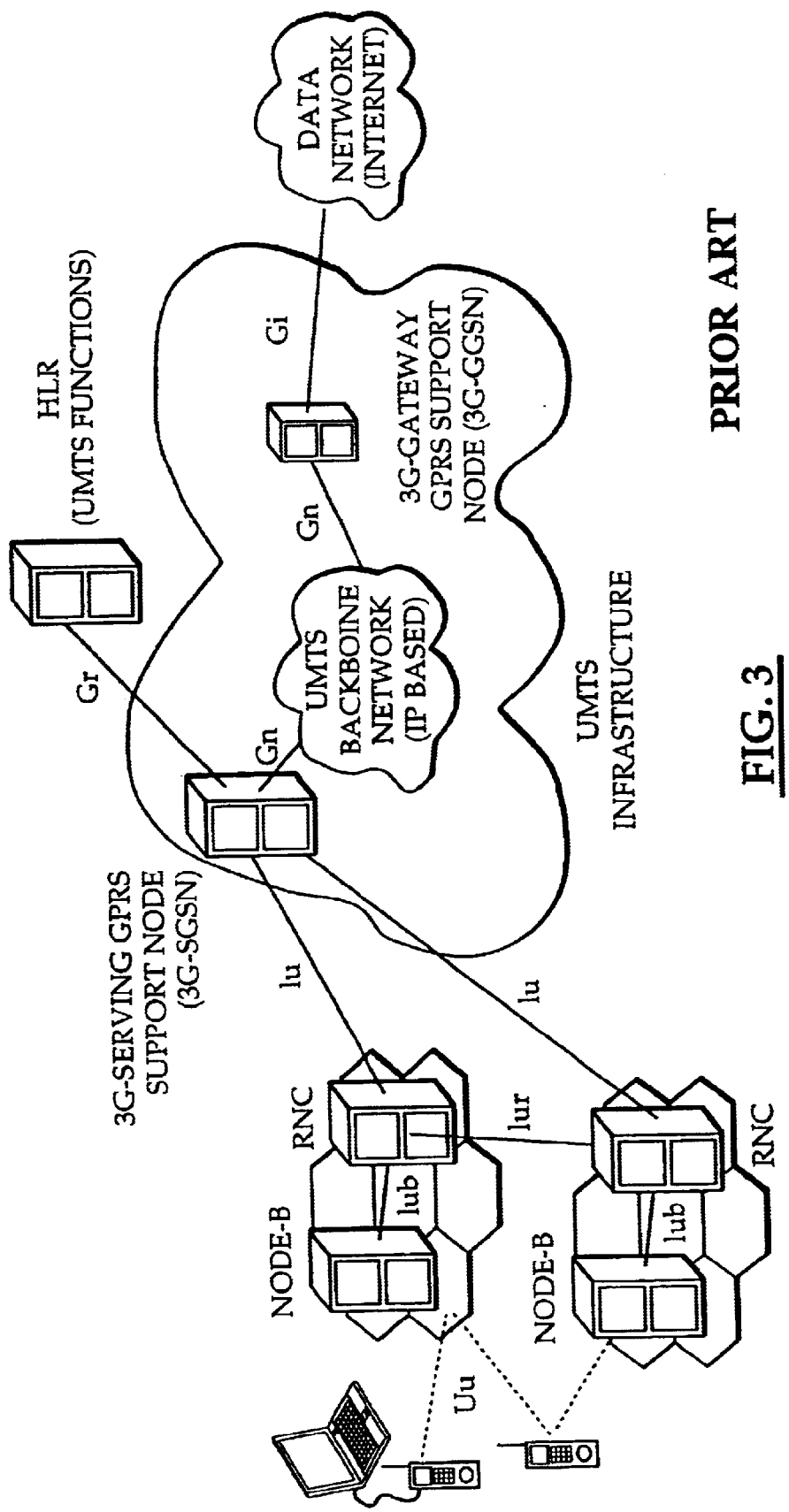
FIG. 3 shows a universal mobile telecommunications system (UMTS) packet network architecture, according to the prior art.
Figure 4:
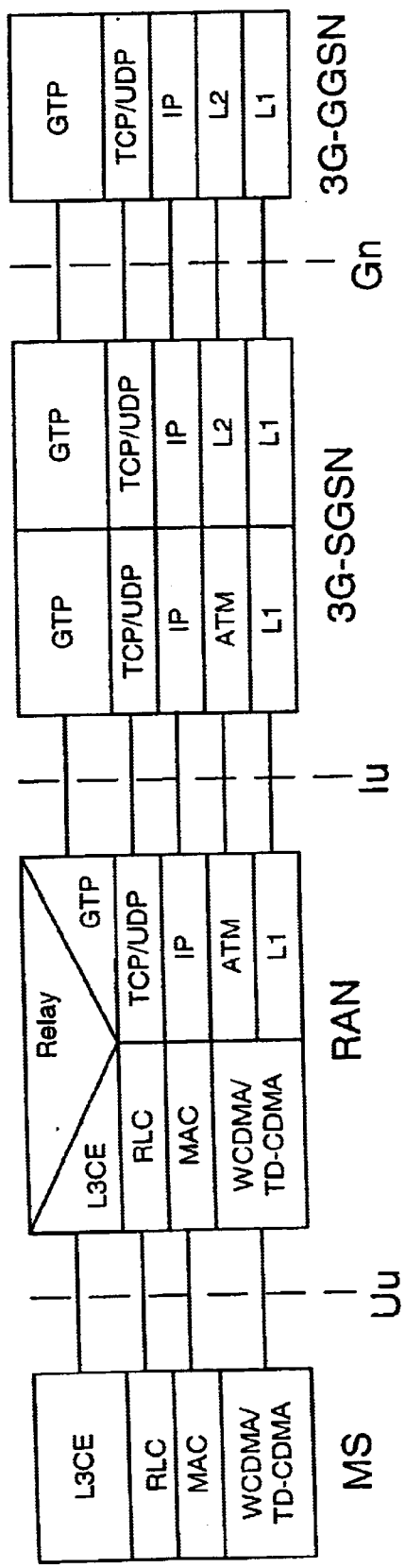
FIG. 4 shows a UMTS user plane protocol stack, according to the prior art.
Figure 5:
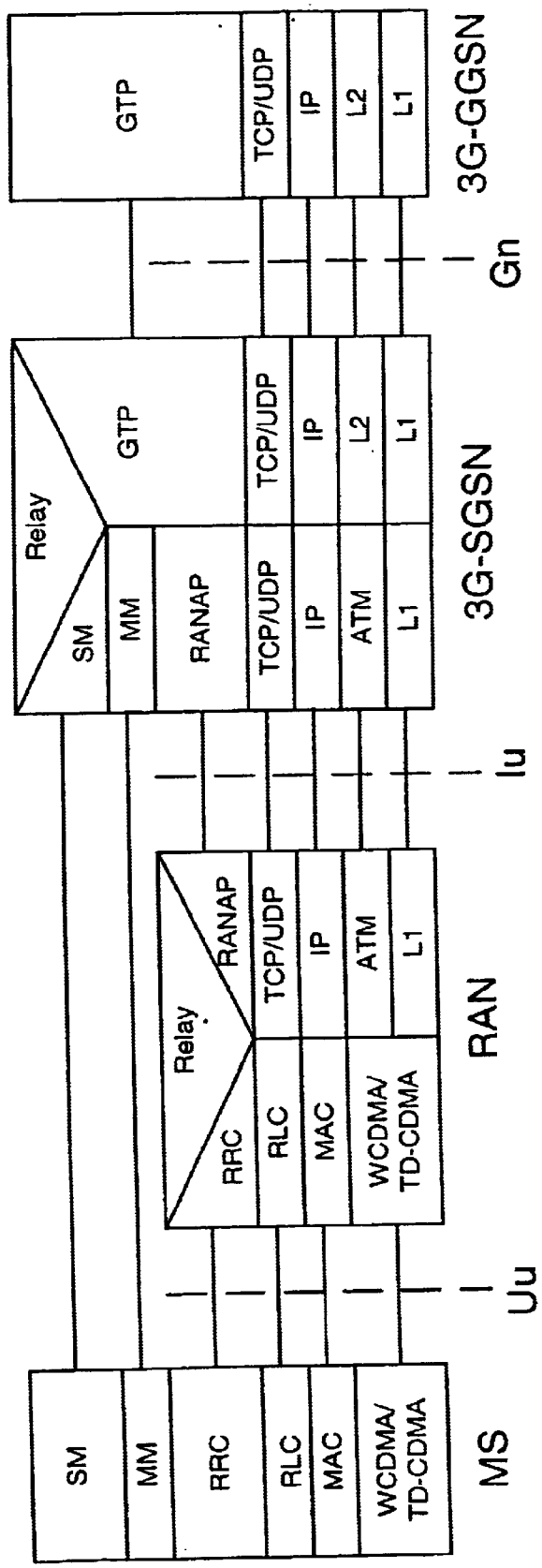
FIG. 5 shows a UMTS control plane protocol stack, according to the prior art.
Figure 6:
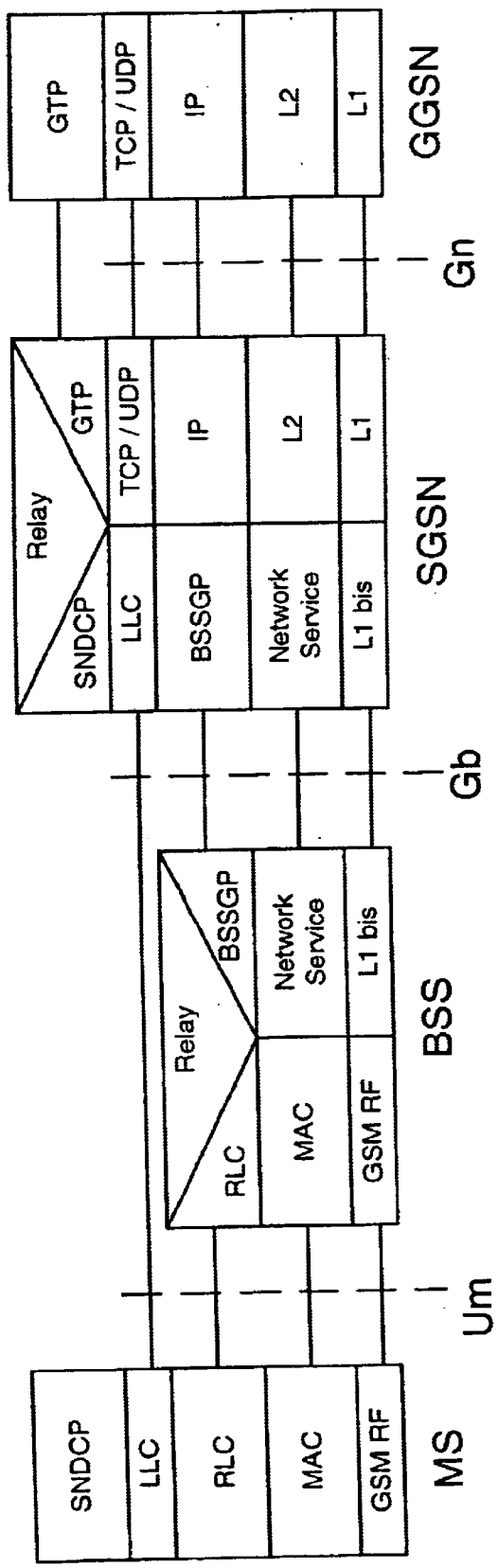
FIG. 6 shows a GPRS user plane protocol stack, according to the prior art.
Figure 7:
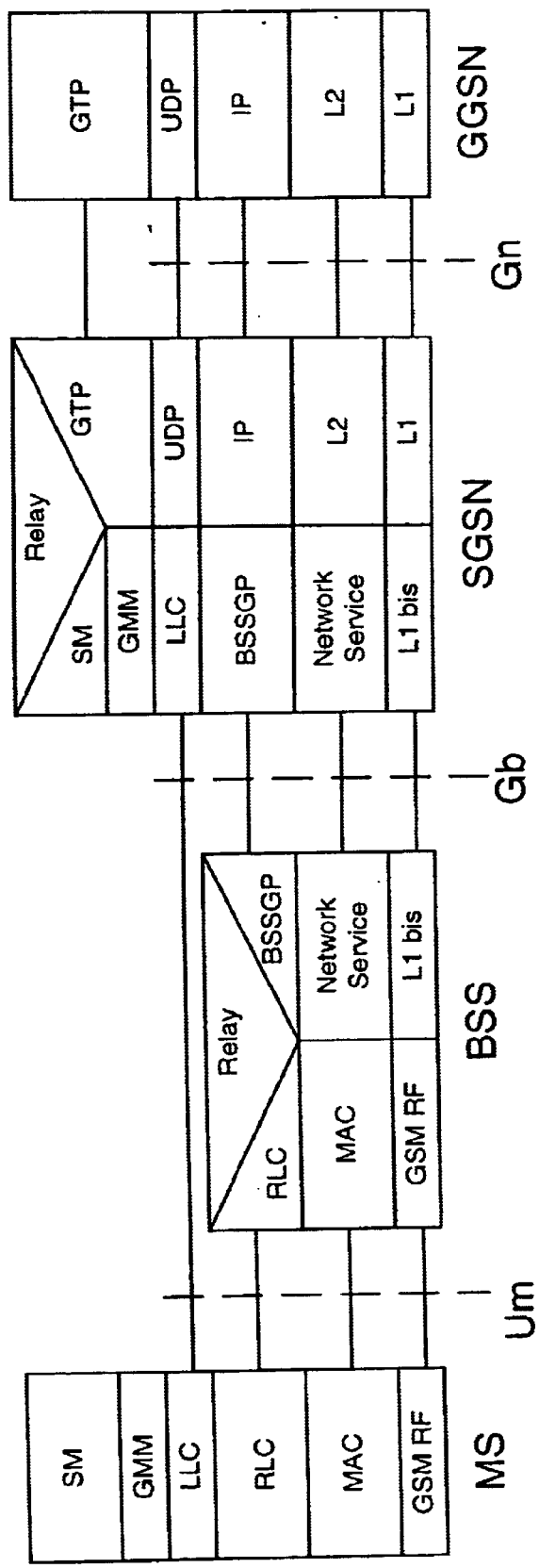
FIG. 7 shows a GPRS control plane protocol stack, according to the prior art.

In the evolution towards more capable wireless communication systems, new architectures are being introduced, including those shown in FIGS. 2 and 3. In FIG. 2, a general packet radio service (GPRS) network architecture is shown, while FIG. 3 shows a universal mobile telecommunications system (UMTS). FIG. 4 shows a user plane protocol stack for the UMTS. FIG. 5 shows a control plane protocol stack for the UMTS. FIG. 6 shows a GPRS user plane protocol stack, while FIG. 7 shows a control plane protocol stack for GPRS. In all of these wireless network architectures, there is the capability of either unacknowledged or acknowledged transfer of messages. In the acknowledge mode, reception by a receiver of all information packets transmitted by a transmitter over a communications link are acknowledged by the receiver sending at least one acknowledgement over the communications link back to the transmitter. In other words, a separate acknowledge message may be sent in response to each received information packet, or some other combination of response messages can be sent. For instance, only one acknowledgement message could be sent back indicating reception of a group of information packets identified in some convenient manner. In the unacknowledge mode, none of the information packets transmitted by the transmitter over the communications link is acknowledged by the receiver. However, according to the present invention, a modified unacknowledged data transfer mode is introduced.

For instance, when the GPRS SGSN of FIG. 2 sends an "important" LLC PDU (See FIGS. 6 and 7), i.e., a selected packet among a plurality of packets to the MS (or the MS to the SGSN), the SGSN can, for instance, add additional information to the PDU in order to notify the RLC/MAC layers that the LLC PDU needs to be transmitted reliably over the radio interface despite operating in unacknowledged mode. The additional information may be associated with existing QoS parameters or it may be a new parameter. In this disclosure the information is called UPTM (Unacknowledged Packet Transmission Mode). UPTM may have different signaling mechanisms and/or values depending on the transfer mode being used. For the example, the sender of the LLC PDU should also provide enough information to the RLC/MAC layers in order that the RLC/MAC will be able to notify higher layers after transmitting the important LLC PDU (if necessary). The information may be, e.g., a sequence number that is unique in the sending side for the MS/QoS queue.

When the RLC/MAC layers receive the LLC PDU to which the UPTM field is associated, RLC/MAC operates, for instance, as described below. It should be realized that the description below is merely one way to carry out the invention on the transmitting side according to the present invention. For example, if the message is a packet, there are numerous ways to implement the invention carried out on the transmitting side. For instance, the important packet to be acknowledged is sent, and subsequent normal unacknowledged packets are stored on the transmitting side and sent only after receiving an acknowledge message back from the receiving side, and thereafter removing them from memory on the transmitting side. Another way to do it is to send and store both the important packet to be acknowledged and subsequent unacknowledged packets. If necessary, all saved packets can be retransmitted. After receiving a positive acknowledgement back from the receiver side, the stored packets can be erased from memory on the transmitting side. Another way to do it is to send both the important packet to be acknowledged and subsequent normal unacknowledge packets, but only storing the important packet to be acknowledged. Still another example would be to send both the important packet to be acknowledged and subsequent normal unacknowledge packets, but not store any packets on the transmitting side. If a negative acknowledgement is received back from the receiving side, retransmission does not take place, but information is communicated to higher protocol layers on the transmitting side (e.g., to the header compression function) that the transmission was not successful. Still another way to do things is to also have the capability to store the important packet, the normal packets, or both on the receiver side only or as well, in combination with any of the above methods used on the transmitting side. Therefore, although the description below shows the possibility of saving on the transmitting side the important packet to be acknowledged and the normal unacknowledge packets, it is possible to implement the invention without saving any packets at all, saving only the important packets, or saving both the important packets and the normal unacknowledge packets on either side or both. Thus, it will be understood that the methodology shown below is merely illustrative of one mode of carrying out the invention, but others may apply as well, as will be appreciated by any person of skill in the art.

Figure 8A:
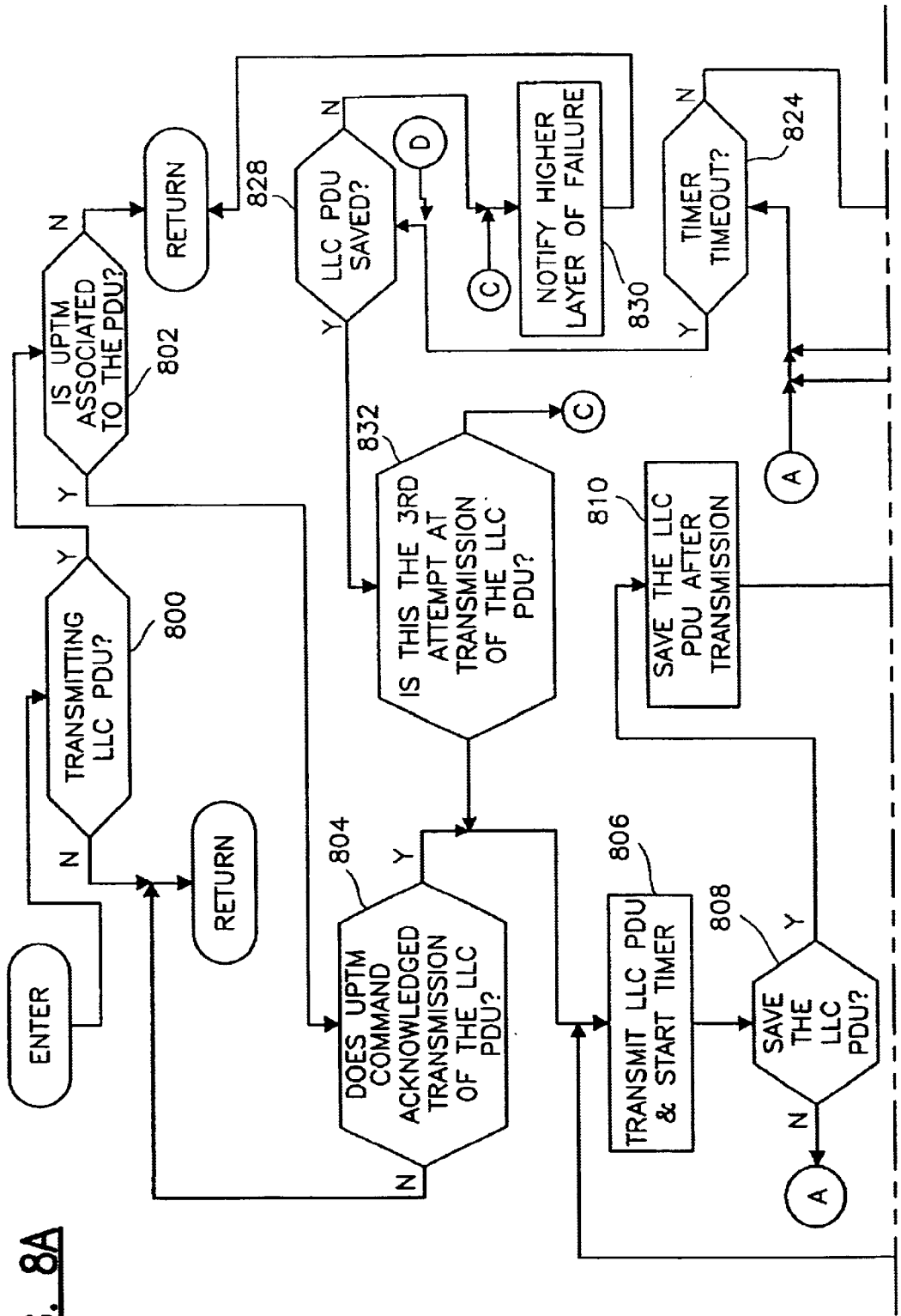
FIGS. 8A and 8B together show a series of steps which may be carried out in a transceiver, according to the present invention, operating in a modified unacknowledge mode as a transmitter sending a selected packet in response to which an acknowledgement is required from the receiver.
Figure 8B:
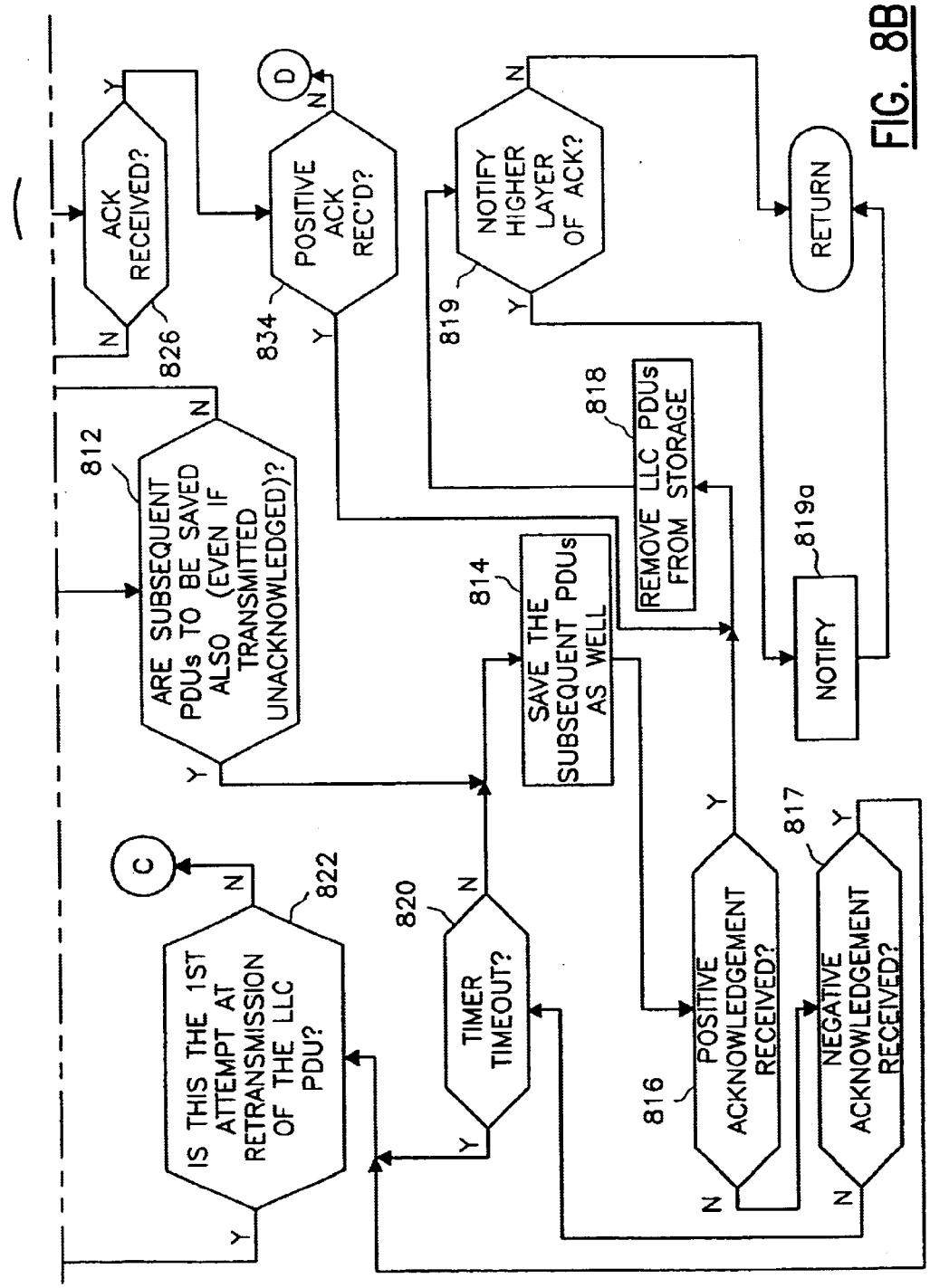

Transmitting Side (FIGS. 8A and 8B)

As shown in step 800 in FIGS. 8A and 8B, when a transmitting side RLC/MAC is transmitting an LLC PDU, a step 802 is executed by the RLC/MAC layers to check if a UPTM is associated with the PDU to be transmitted. In case UPTM is associated to the LLC PDU, a determination is then made in a step 804 if the UPTM (or specification) commands an "acknowledged" transmission of the LLC PDU; if so, a step 806 is executed to transmit the LLC PDU and start a timer. At the same time, a step 808 determines whether the LLC PDU to be transmitted in step 806 is to be saved or not. If so, the LLC PDU is saved. RLC/MAC does not remove the LLC PDU before receiving positive acknowledgement back from the receiver for the LLC PDU or the timer expires. Optionally, as indicated in steps 812, 814, the RLC/MAC may keep also the subsequent LLC PDUs even if they are to be sent using normal "unacknowledged" operation before the important LLC PDU is acknowledged. Whether this is to be used may also be determined in step 812, e.g., based on UPTM.

When receiving positive acknowledgement for the important LLC PDU in a step 816, the transmitting side shall remove the LLC PDU as shown in a step 818. If the transmitting side kept also subsequent LLC PDUs in a step 812, the transmitting side shall remove also those LLC PDUs. After that, a step 819 can be used to determine whether a notification to a higher layer (of the receipt of the acknowledgement message) should be done or not. So, a notification is made, as indicated in a step 819*a*, or a return is made directly if no notification is required.

When receiving negative acknowledgment from the receiver (as determined in the step 817) for the important LLC PDU, the transmitting side shall/may retransmit the LLC PDU. If the transmitting side kept also subsequent unacknowledged LLC PDUs, the transmitting side shall/ may also retransmit those LLC PDUs. A retransmission can be done using step 806, as shown. The purpose of the mechanism is that the receiving side is able to handle the subsequent LLC PDUs correctly (e.g., the important LLC PDU may contain changed decoding parameters) without additional buffering of unacknowledged LLC PDUs. Rather than retransmit endlessly without success, however, a mechanism can be provided, as shown in a step 822 for determining if this is a repeat attempt. If so, a failure can be declared as indicated in a step 830. Of course, the number of allowed repetitions is a design choice.

If it is determined in the step 812 that subsequent PDUs are not to be saved, a determination is made in a step 824 as to whether the timer has timed out or not. If not, a determination is made in a step 826 as to whether an acknowledge message has been received or not from the receiver. If not, the step 824 is executed again to find out if the timer has timed out yet. These two steps 824, 826 are repeated until either the timer times out or an acknowledgement message is received. In case the timer times out before receiving an acknowledgement message, a step 828 is executed to find out if the selected LLC PDU has been saved or not. If not, a step 830 is executed to notify a higher layer of the protocol stack of the transmitting side of a failure, and a return is made. If it is determined in step 828 that the selected LLC PDU was, in fact, saved, it is retransmitted in the step 806 and the process continues, as before. In this case, there may also be a step similar to step 822 introduced to prevent an endless repetition in case an acknowledgement is never received. Such a step 832 is shown being executed after the step 828 and before step 806.

If in the repetitions of the steps 824, 826, an acknowledgement message is received, as determined in the step 826 before the timer times out, a determination can be made in a step 834 as to whether or not the acknowledgement is positive or not. If positive, the saved LLC PDU or PDUs can be removed from memory by executing step 818, as shown, and determining whether to notify a higher layer of the positive acknowledgement before returning. If the acknowledgement was negative, the step 828 can be executed to determine if the LLC PDU was saved or not. If not, a notification of failure can be made in the step 830 before making a return. If so, retransmission can be made by executing the steps 832 et seq.

It should be realized that in the transmitting side, a notification can be given to higher layers of a protocol stack whether acknowledgement (ACK) or negative acknowledgement (NACK) was received, or a timer has expired, meaning that the sending of PDUs was unsuccessful. Also, in the receiver side, notification can be given to a higher layer whether the packet was correctly received or not.

Figure 9A:
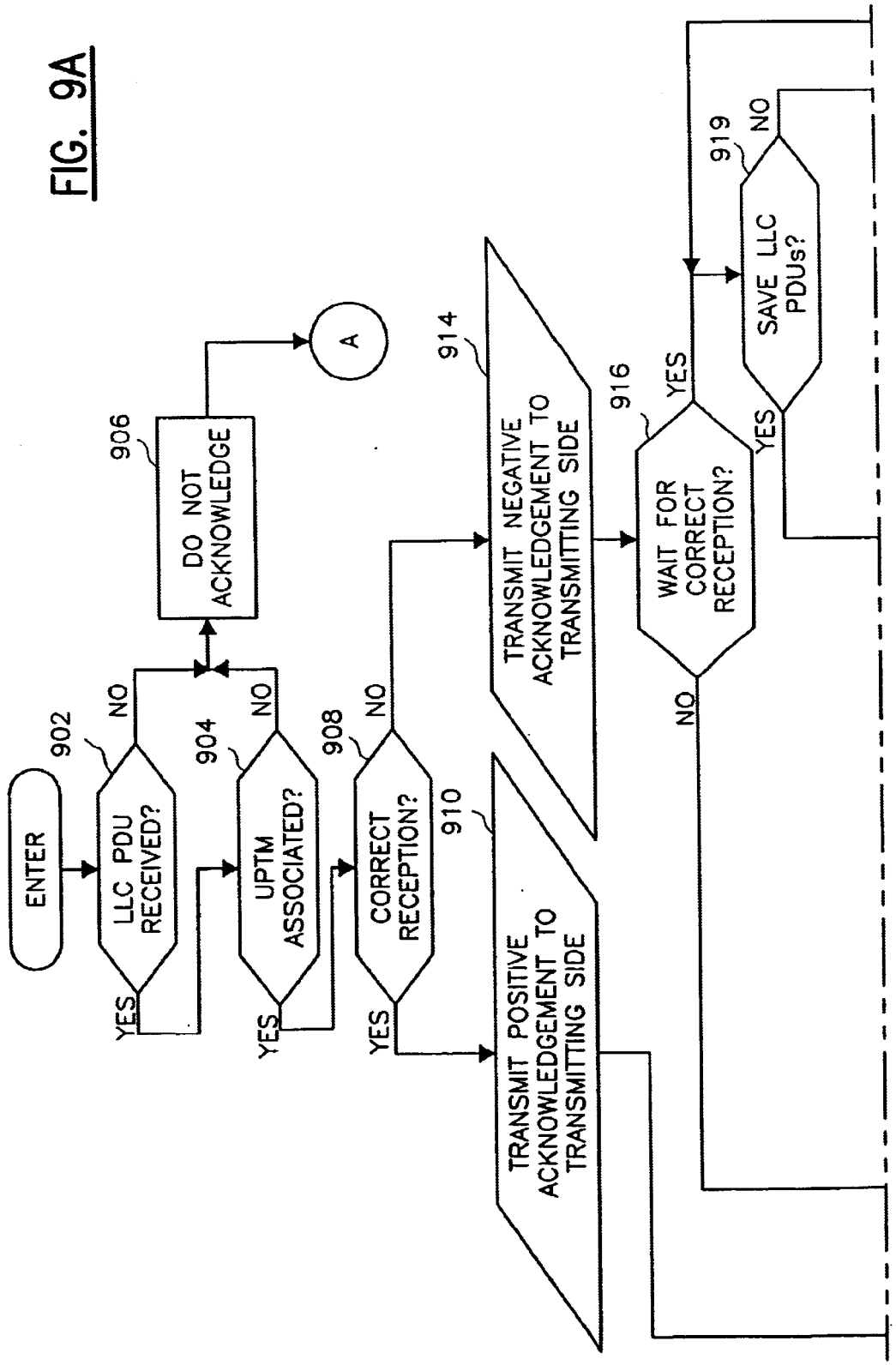
FIGS. 9A and 9B together show a series of steps carried in a transceiver, according to the present invention, operating in unacknowledge mode as a receiver of a selected packet for which an acknowledgement is required by the transmitter.
Figure 9B:
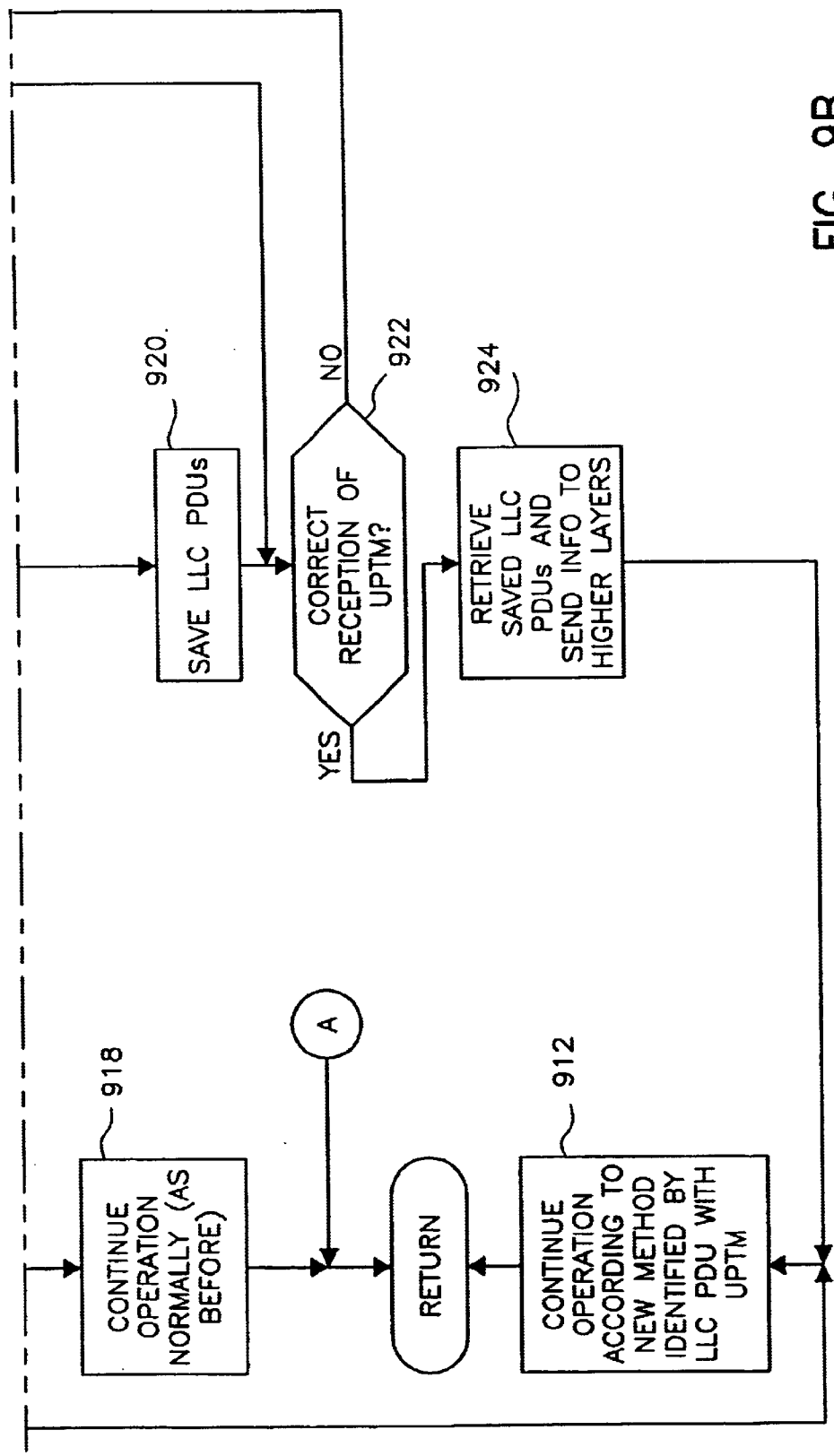

Receiving Side (FIGS. 9A and 9B)

FIGS. 9A and 9B show one way to implement a receiving side scenario, according to the present invention. After detecting in a step 902 that an LLC PDU has been received, a step 904 is executed to determine if a UPTM is associated therewith. If a negative determination is reached in either step 902 or 904, then the receiver does not make any acknowledgement, as indicated in a step 906, before making a return. If, however, the step 904 determines that the LLC PDU is a PDU selected to notify the receiver that it is an important PDU that needs to be acknowledged, then a determination is made in a step 908 as to whether it has been received correctly or not. If so, a positive acknowledgement is transmitted from the receiving side to the transmitting side and is detected in the step 826 of FIG. 8B, as explained previously. A step 912 is then executed to ensure that operation is continued according to any new method identified by the selected LLC PDU. Subsequently a return is made, as indicated.

If, on the other hand, reception of the selected LLC PDU was not correct, as determined in the step 908, then a negative acknowledgement is transmitted to the transmitting side from the receiving side, as indicated in a step 914. A determination is then made in a step 916 as to whether the receiving side should wait for correct reception. If not, operation is continued normally (as before), as indicated in a step 918, without taking into account any important message sent by the selected PDU, and a return can be made, as indicated. If the receiving side is to wait for correct reception, incoming LLC PDUs can optionally be stored, as determined in a step 191. If so, they are saved as indicated in a step 920 until the next selected LLC PDU is received (with UPTM) as determined in a step 922. If a correct UPTM is received, the saved LLC PDUs can be retrieved and operated upon according to the intent of the original LLC PDU which was not received correctly. This is indicated in a step 924, followed by the continued operation of step 912, followed by a return. The choice of whether to save LLC PDUs on the transmitting side (as per FIGS. 8A and 8B) or the receiving side (as per FIGS. 9A and 9B) is a design choice. If it were determined in the step 922 that correct reception of a next selected LLC PDU has not occurred, subsequent LLC PDUs can continue to be saved, as indicated in the step 920, until correct reception is achieved. Rather than having an endless loop in case of never receiving a correct LLC PDU with UPTM, a mechanism can be inserted (not shown) to stop same from going on forever. Such could be a timer which, upon timing out, would allow exit from the loop and a transition to the step 918 for continued operation normally (as before).

Transceiver

FIGS. 10A and 10B show a transceiver apparatus which can be used as both a transmitter on the transmitting side or a receiver on the receiving side. It includes a means 1000 for transmitting and receiving info packets over a wireless interface. An interface bus 1002 is directly connected to an air interface, for example, by means of an antenna (not shown). An internal bus 1004 is connected to various blocks shown in FIG. 10 and to other internal blocks (not shown) of a receiving section or a transmitting section, as the case may be. I.e., the various blocks of FIGS. 10A and 10B are shown in two sections, a transmitting section 1006 and a receiving section 1008. The transmitting section 1006 includes means for determining a selected packet 1010, i.e., corresponding to the step 802 of FIG. 8A, wherein it is determined whether a UPTM is associated with a PDU on the bus 104. This may mean detecting an LLC PDU that already has a UPTM associated therewith, or it may mean actually associating the UPTM to a given PDU, or the like. In any event, the means 1000 transmits the selected LLC PDU on the bus 1002, over the air interface to the receiving side, which also has apparatus similar to that shown in FIGS. 10A and 10B. The receiving section 1008 on the receiving side, while receiving packets, will determine by means 1012 whether there is a selected LLC PDU incoming, and whether it was received correctly, as per steps 902, 904, 908 of FIG. 9A. It will determine by means 1014 whether the incoming packet requires an acknowledgement. It will use means 1016 to acknowledge (or negatively acknowledge) receipt back to the transmitting side over the air interface.

Back on the transmitting side, means 1018 will receive the acknowledge message and provide an indication of reception thereof to means 1020 that has been waiting, as per the timer started in step 806 of FIG. 8A for such acknowledgement. Such means 1020 implements, for example, the decision block 820 of FIG. 8B and the decision block 824 of FIG. 8A. Similarly, the means 1018 implements, for instance, the decision steps 816, 826 of FIG. 8B.

As has already been mentioned in connection with the description of FIGS. 8A and 8B, there are cases where it is desired to save the selected LLD PDU as well as subsequent PDUs until positive acknowledgement is received back from the receiving side. This storage function can be carried out by the means 1022, 1024, as shown in FIGS. 10A and 10B. In the event that positive acknowledgement is not received back before the timer function 1020 times out, the means 1020 can signal a means 1026 to retrieve the stored LLC PDU from the means 1022 and the normal packets from the means 1024 for retransmission on the bus 1002 to the receiving means. In this way, the retransmission function of FIGS. 8A and 8B is carried out by the transmitting section 1006 of the transceiver means of FIGS. 10A and 10B. As mentioned, this transceiver means will be present on both sides of the wireless interface, i.e., in both the transmitting side equipment and the receiving side equipment. Since both sides perform both functions, depending on which side is initiating the transfer, the particular side in which the transceiver resides is not specified in FIGS. 10A and 10B.

RLC Block Acknowledgement

One of the following mechanisms, among others, may be used to provide acknowledgement information to the transmitting side.

RLC Acknowledgement Message Bitmap

In GPRS, according to the present invention, regardless of whether RLC acknowledgement (ACK) or RLC unacknowledgement (UNACK) blocks are being transmitted, the network and the MS keep sending acknowledgement messages (e.g., Packet Uplink/Downlink ACK/UNACK) containing acknowledgement including ACK bitmaps which contain valid acknowledgement information either always (in acknowledge mode), or only in cases when an important LLC PDU is being transferred (modified unacknowledge mode).

When UNACK RLC data blocks are being transmitted, the bitmap doesn't contain valid information in the current evolution of GPRS (but is still included into ACK messages) but the ACK message is used for control purposes: when receiving ACK message, the other peer knows its connection is still OK, and the other side is also able to transfer some control information (e.g., measurement) in the ACK message. See Chapter 9 of European Standard Draft EN 301 349 v7.0.0 (1999-07) entitled "Digital Cellular Telecommunications System (Phase 2+); General Packet Radio Service (GPRS); Mobile Station (MS)-Base Station System (BSS) Interface; Radio Line Control/Medium Access Control (RLC/MAC) protocol (GSM 04.60 version .0.0 Release 1998). So the invention can use as one mechanism to use these bitmaps (since they are being transmitted anyway) to obtain information about whether an important message was transferred successfully or not. Then there would be no need to use a separate procedure to ACK important messages. This may also be applied to other systems containing signaling procedures like GPRS.

Either by specification or information included in messages used to establish a TBF can be used to notify the peer RLC/MAC for the case where the acknowledgement bitmap contains always valid acknowledgement information when transferring otherwise unacknowledged RLC data in the TBF. The information included in messages used to establish the TBF may be, e.g., a new field in the Packet Resource Request message in case an UL TBF is being established or Packet Downlink Assignment message in case a DL TBF is being established.

In case the acknowledgement bitmap included in the Acknowledge message contains valid acknowledgement information only in cases when an important LLC PDU is being transmitted, the following mechanisms may be used:

The RLC data block (either the first one, all or the last one) carrying important LLC PDU contains information that the receiving side shall acknowledge the received LLC PDU. In the first RLC data block, the segment to which the LLC PDU is placed into the RLC data block may be identified, because the RLC data block may contain multiple LLC PDUs in case they are short.

The transmitting side shall notify the receiving side with a control message that an important LLC PDU is being transmitted after a short period. The message identifies the important LLC PDU, by containing, e.g., a BSN (Block Sequence Number) of the RLC block in which the LLC PDU transmission begins, so that the receiving side is able to determine which LLC PDU (which RLC data blocks) shall be acknowledged. Also, the message may identify the segment to which the LLC PDU is placed into the RLC data block, because the RLC data block may contain multiple LLC PDUs in case they are short.

Another mechanism could be that a signaling message requesting acknowledgement is transmitted from the transmitting side to the receiving side after sending the important LLC PDU.

Control Message

The same procedures as described above apply in order to notify the peer RLC/MAC that a certain LLC PDU shall be acknowledged.

The acknowledgement of important LLC PDU takes place using a separate control message that contains enough information to (negatively) acknowledge an LLC PDU. The message may contain, e.g., BSNs of RLC data block containing the LLC PDU.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method for use in a telecommunications system (GPRS) having the capability to exchange information packets over a communications link (Um) in both an acknowledge mode, in which reception by a receiver (BSS) of all information packets transmitted by a transmitter (MS) over the communications link (Um) are acknowledged by the receiver (BSS) sending at least one acknowledgement over the communications link (Um) back to the transmitter (MS), and in an unacknowledge mode in which none of the information packets transmitted by the transmitter (MS) over the communications link (Um) are acknowledged by the receiver (BSS), characterized by:

said transmitter (MS) in said unacknowledge mode nevertheless determining from among a plurality of packets destined for transmission to the receiver (BSS) in said unacknowledge mode a selected packet (PDU) for which an acknowledgement of receipt from the receiver (BSS) is required, and signaling said receiver (BSS) that said acknowledgement of receipt of said selected packet (PDU) is required from the receiver (BSS), wherein the selected packet (PDU) is selected if incorrect reception of the selected packet (PDU) would cause other packet data to be lost or if the selected packet (PDU) is more important than others, the selected packet (PDU) being a reference packet that serves as a basis for further transmissions which indicate changes as compared to the reference packet.

2. The method of claim 1, further characterized by said transmitter (MS) after transmitting said selected packet (PDU), waiting during a set time period thereafter for receipt of said acknowledgement from said receiver (BSS) before taking further steps contingent on said acknowledgement of receipt by said receiver (BSS).

3. The method of claim 2, further characterized by said transmitter (MS) storing the selected packet (PDU) during said set time period at least until said receipt of said acknowledgement from said receiver (BSS).

4. The method of claim 3, further characterized by said transmitter (MS), after said selected packet (PDU) is transmitted to the receiver (BSS), also storing during said set time period packets for which acknowledgement is not required at least until said receipt of said acknowledgement from said receiver (BSS).

5. The method of claim 4, further characterized by said transmitter (MS) retransmitting to said receiver (BSS) said stored selected packet (PDU) and said stored packets for which acknowledgement was not required after said set time elapses without receipt of said acknowledgement from said receiver (BSS).

6. The method of claim 3, further characterized by said transmitter (MS) retransmitting to said receiver (BSS) said stored selected packet (PDU) after said set time elapses without receipt of said acknowledgement from said receiver (BSS).

7. The method of claim 6, further characterized by said transmitter (MS) receiving over said communications link (Um) from said receiver (BSS) an acknowledgement of receipt of said selected packet (PDU) and by notifying a higher layer in a protocol stack of the transmitter (MS) of said receipt of said selected packet (PDU) by said receiver (BSS).

8. The method of claim 6, further characterized by said transmitter (MS) waiting for at least one further set time period after said step of retransmitting said stored selected packet (PDU) for an acknowledgement of receipt thereof from the receiver (BSS) before finally concluding that said retransmitted stored selected packet (PDU) was not received by the receiver (BSS).

9. The method of claim 8, further characterized by said transmitter (MS) notifying a higher layer in a protocol stack of the transmitter (MS) of nonreceipt of said retransmitted stored selected packet (PDU).

10. The method of claim 5, further characterized by said transmitter (MS) waiting for at least one further set time period after said step of retransmitting said stored selected packet (PDU) and said stored packets for which acknowledgement was not required, for an acknowledgement of receipt of the stored selected packet (PDU) from the receiver (BSS) before finally concluding that said retransmitted stored selected packet (PDU) was not received by the receiver (BSS).

11. The method of claim 10, further characterized by said transmitter (MS) notifying a higher layer in a protocol stack of the transmitter (MS) of nonreceipt of said retransmitted stored selected packet (PDU).

12. The method of claim 2, characterized by said transmitter (MS) concluding after lapse of said set time period without receiving said acknowledgement that said selected packet (PDU) was not received by said receiver (BSS).

13. The method of claim 12, further characterized by said transmitter (MS) notifying a higher layer in a protocol stack of the transmitter (MS) of nonreceipt of said acknowledgement.

14. The method of claim 1, characterized by said receiver (BSS) in said unacknowledge mode determining reception over said communications link (Um) of said selected packet (PDU) for which acknowledgement of receipt is required, and signaling said acknowledgement of receipt to said transmitter (MS) over said communications link (Um).

15. The method of claim 14, characterized by said receiver (BSS) determining whether said received selected packet (PDU) was received correctly or not wherein said step of signaling said acknowledgement of receipt to said transmitter (MS) indicates correct or incorrect reception.

16. The method of claim 15, characterized by said transmitter (MS) storing the selected packet (P DU) during said set time period at least until receipt of said acknowledgement from said receiver (BSS) and upon receipt by said transmitter (MS) of said acknowledgement indicative of incorrect reception of said selected packet (PDU), retransmitting said selected packet (PDU).

17. The method of claim 15, characterized by said receiver (BSS), after determining the selected packet (PDU) was received incorrectly, continuing to process incoming packets without any change in processing method therefor.

18. The method of claim 15, characterized by said receiver (BSS) saving packets received after determining the selected packet (PDU) was received incorrectly until receiving the selected packet (PDU) correctly after which the receiver (BSS) processes incoming packets according to a method identified by said selected packet (PDU).

19. The method of claim 1, characterized by said transmitter (MS) receiving over said communications link (Um) from said receiver (BSS) an acknowledgement of receipt of said selected packet (PDU) and by notifying a higher layer in a protocol stack of the transmitter (MS) of said receipt of said selected packet (PDU) by said receiver (BSS).

20. Transceiver having a receiving section and a transmitting section for use on both a receiving side and a transmitting side in a communications telecommunications system having the capability to exchange information packets over a communications link (Um) in both an acknowledge mode in which reception by a receiver (BSS) section of a transceiver on the receiving side of all information packets transmitted by the transmitter (MS) section of a transceiver on the transmitting side over the communications link (Um) are acknowledged by the receiver (BSS) section sending at least one acknowledgement over the communications link (Um) back to the transmitter (MS) section and in an unacknowledge mode in which none of the information packets transmitted by the transmitter (MS) section over the communications link (Um) are acknowledged by the receiver (BSS) section, characterized by:

said transmitter (MS) section in said unacknowledge mode nevertheless having means for determining from among a plurality of packets destined for transmission to the receiver (BSS) section in said unacknowledge mode a selected packet (PDU) for which an acknowledgement of receipt from the receiver (BSS) section is required, and means for transmitting a signal to said receiver (BSS) section that said acknowledgement of receipt of said selected packet (PDU) is required from the receiver (BSS) section, wherein the selected packet (PDU) is selected if incorrect reception of the selected packet (PDU) would cause other packet data to be lost or if the selected packet (PDU) is more important than others, the selected packet (PDU) being a reference packet that serves as a basis for further transmissions which indicate changes as compared to the reference packet.

21. The transceiver of claim 20, further characterized by said transmitter (MS) section receiving over said communications link (Um) from said receiving side an acknowledgement of receipt of said selected packet (PDU) and by notifying a higher layer in a protocol stack of the transceiver of said receipt of said selected packet (PDU) by said receiving side.

22. The transceiver of claim 20, further characterized by said transmitter (MS) section having means for waiting during a set time period after transmitting said selected packet (PDU) for receipt of said acknowledgement from said receiver (BSS) section before taking further steps contingent on said acknowledgement of receipt by said receiver (BSS) section.

23. The transceiver of claim 22, further characterized by said transmitter (MS) section having means for storing the selected packet (PDU) during said set time period at least until said receipt of said acknowledgement from said receiver (BSS) section.

24. The transceiver of claim 23, further characterized by said transmitter (MS) having means for also storing, after said selected packet (PDU) is transmitted to the receiver (BSS), during said set time period packets for which acknowledgement is not required at least until said receipt of said acknowledgement from said receiver (BSS).

25. The transceiver of claim 24, further characterized by said transmitter (MS) having means for retransmitting to said receiver (BSS) said stored selected packet (PDU) and said stored packets for which acknowledgement was not required after said set time elapses without receipt of said acknowledgement from said receiver (BSS).

26. The transceiver of claim 23, further characterized by said transmitter (MS) having means for retransmitting to said receiver (BSS) said stored selected packet (PDU) after said set time elapses without receipt of said acknowledgement from said receiver (BSS).

27. The transceiver of claim 26, further characterized by said transmitter (MS) section receiving over said communications link (Um) from said receiving side an acknowledgement of receipt of said stored selected packet (PDU) and by notifying a higher layer in a protocol stack of the transceiver of said receipt.

28. The transceiver of claim 20, characterized by said receiver (BSS) section in said unacknowledge mode having means for determining reception over said communications link (Um) of said selected packet (PDU) for which acknowledgement of receipt is required, and means for signaling said acknowledgement of receipt to said transmitter (MS) second over said communications link (Um).

29. The transceiver of claim 28, characterized by said receiver (BSS) section determining whether said received selected packet (PDU) was received correctly or not, wherein said step of signaling said acknowledgement of receipt to said transmitter (MS) section indicates correct or incorrect reception.

30. The transceiver of claim 29, characterized by said transmitter (MS) section storing the selected packet (PDU) during said set time period at least until receipt of said acknowledgement from said receiver (BSS) section and upon receipt by said transmitter (MS) section of said acknowledgement indicative of incorrect reception of said selected packet (PDU), retransmitting said selected packet (PDU).

31. The transceiver of claim 29, characterized by said receiver (BSS) section, after determining the selected packet (PDU) was received incorrectly, continuing to process incoming packets without any change in the processing method therefor.

32. The transceiver of claim 29, characterized by said receiver (BSS) section saving packets received after determining the selected packet (PDU) was received incorrectly until receiving the selected packet (PDU) correctly after which the receiver (BSS) section processes incoming packets according to a method identified by said selected packet (PDU).

* * * * *